Oct. 14, 1930.                E. WILDHABER                1,778,541
                    METHOD OF GRINDING RELIEF ON TOOLS
                    Filed May 20, 1927          2 Sheets-Sheet 1

INVENTOR
Ernest Wildhaber

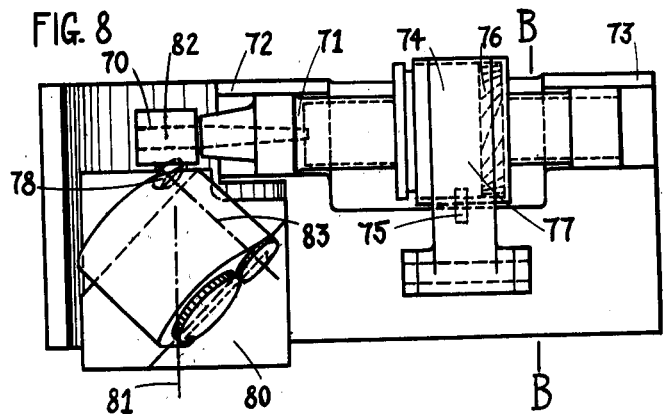
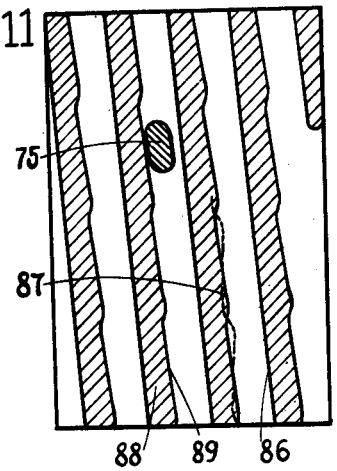
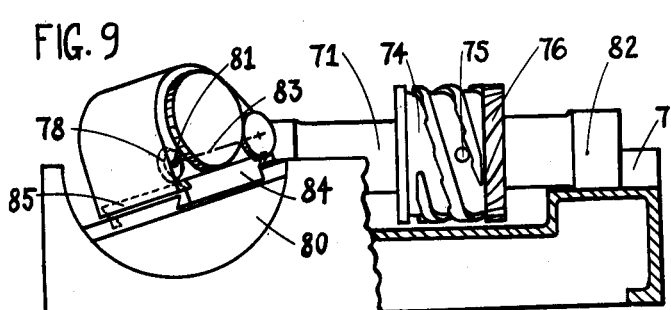
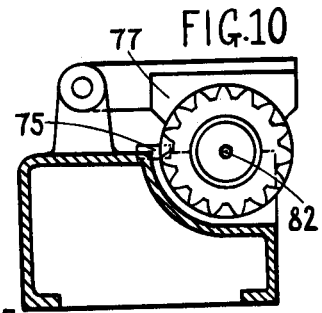
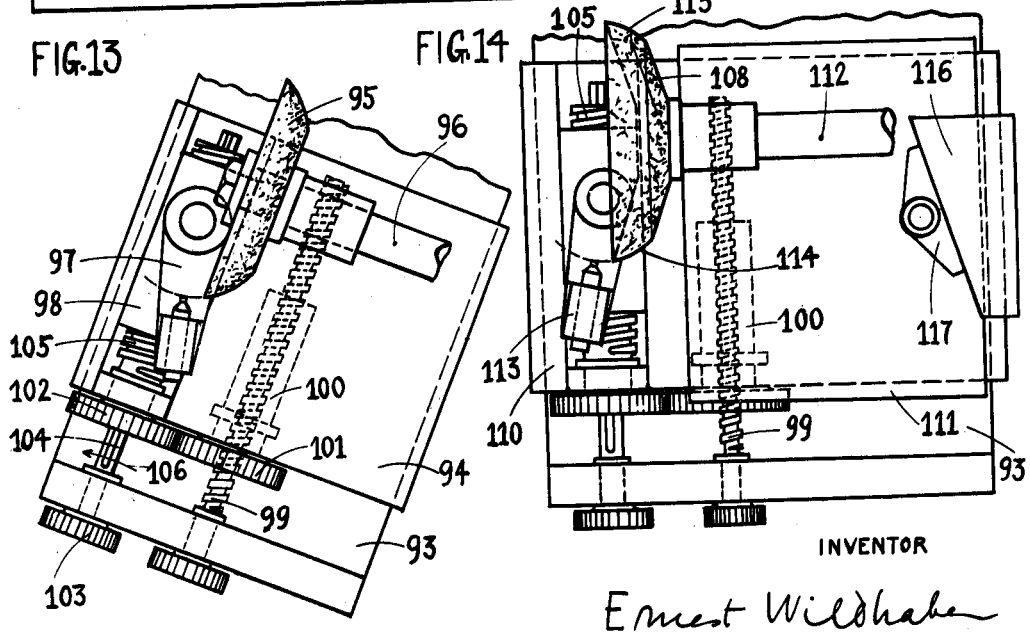

Patented Oct. 14, 1930

1,778,541

UNITED STATES PATENT OFFICE

ERNEST WILDHABER, OF BROOKLYN, NEW YORK

METHOD OF GRINDING RELIEF ON TOOLS

Application filed May 20, 1927. Serial No. 192,976.

The present invention relates to methods of grinding relief on tools, especially on such tools which are resharpened by re-grinding the cutting faces.

One object of the present invention is to provide a method for grinding relief on tools having curved cutting edges, which furnishes exactly the same product with grinding wheels of equal profile but different diameters.

A further purpose is to devise a practical and expedient method of grinding relief on gear hobs having curved cutting edges, and especially of hobs as described in my application Serial No. 12,572 filed March 2, 1925.

A still other aim is to provided improvements in truing grinding wheels of curved profile, and to provide a novel arrangement of truing a grinding wheel while in position.

Another aim in view is to provide a method of grinding axial relief on hobs and milling cutters, which is very simple and requires a minimum of movable parts.

Another object is to secure a device for regrinding relief on tools, which is simple, which maintains its accuracy, and which is inexpensive.

A still further object is to devise a novel and simple way of returning a hob to starting position, and a novel way of indexing a multiple start hob, and broadly a novel way of indexing.

Further objects will be apparent in the course of the specification and from recital of the appended claims.

My invention will be explained with reference to the accompanying drawings, in which Fig. 1 is a plan view, partly a section, of a helicoidal thread of convex profile, in engagement with a grinding wheel, the relative positions of thread and wheel being such that grinding contact is effected along the profile of an axial section of the grinding wheel.

Fig. 8 is a diagrammatic plan view of a grinding machine operating in accordance with the present invention, and suited for grinding threads and particularly the relieved threads of hobs.

Fig. 9 is a front view, partly a section of the same.

Fig. 10 is a section along lines B—B of Fig. 8.

Fig. 11 is a partial development of a master form, such as may be provided on a machine according to Figures 8–10. The form indicated corresponds to a single start hob.

Fig. 13 is a diagrammatic plan view of a device for truing a grinding wheel on a line other than the line of grinding contact with a blank, and for advancing the grinding wheel in correspondence therewith.

Fig. 14 is a diagrammatic plan view of a device having the same purpose and adapted to grinding wheels of cup form.

One of the foremost applications of the present invention is to grinding the relieved surfaces of gear hobs, and especially of gear hobs having curved cutting profiles.

Difficulty has been hitherto experienced in such cases, inasmuch as the tooth shape of produced hobs changes to a certain extent, although the grinding wheels used in grinding their relieved surfaces may have been trued or dressed to exactly the same profile. It is found that a different shape is produced on the hob when the grinding wheels used in its production are on their initial, large diameter as compared with the shape resulting when the grinding wheels have been dressed to a smaller diameter and are nearly at the end of their life. The difference is the more pronounced the steeper the threads of a hob are, and shows therefore up increasingly on hobs provided with multiple threads or starts.

When relieving a hob or milling cutter with a formed tool, in such manner as usual, namely so that the relieved surface can be considered as the relative path of the cutting edge of the tool with respect to the blank, then the cutting line, or line of contact between tool and the finished surface of the blank, is always identical with the cutting edge of the tool. The location and form of the cutting line is therefore definitely established.

When grinding however the relieved side surfaces of hobs or milling cutters, then the line of grinding contact is a line whose shape and position cannot be simply assumed at will, as in the case of the said formed tool. The grinding line will be somewhere on the surface of the grinding wheel, and can be mathematically determined from the knowledge, that at any point of contact, the normal to the grinding surface must also be a normal of the particular warped surface, which is formed on the blank. Usually the grinding line will not extend along the profile of an axial section of the grinding wheel, but at an angle to it.

One way of producing identical hobs or milling cutters with grinding wheels of different diameters is by locating the grinding line, that is the line of contact between wheel and blank, and by truing the grinding wheel along the very grinding line. Another and preferred way is by locating the grinding line, by truing the grinding wheel on a line differently placed than the grinding line, and by providing a displacement or feed of the truing line to compensate for its position away from the grinding line.

Moreover the grinding wheel is preferably so positioned with respect to the relieved surfaces of the blank, that grinding contact takes place along the profile of an axial section of the grinding wheel.

Figure 1:
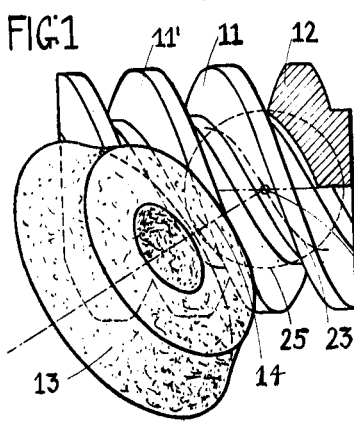

In Fig. 1 of the drawings I have shown helicoidal threads 11 having a convex profile 12 in axial section. The particular member contains three starts or threads. Although the present application refers to grinding the relieved sides of cutting teeth rather than continuous threads, continuous threads have been shown, so that reference can be made to fewer and longer surfaces of the same general nature, or approximately the same as the relieved sides. In accordance with the present invention the teeth of hobs having a curved profile, are preferably relieved in the direction of the axis of the hob, in which case the resulting relieved surfaces are true helicoidal surfaces. A grinding wheel 13 is indicated in grinding contact with one of threads 11, contact being made along a line 14, which coincides with the projection of the axis of the wheel. It is noted that grinding contact is made along the profile of an axial section of the grinding wheel, and that the plane which is constituted by said grinding profile and the axis of the grinding wheel, hereafter called the grinding plane, is inclined to the axis 15 of the threads. How to determine and how to place a grinding wheel with respect to a blank having a curved profile, so that grinding contact is effected in a desirable manner, will be explained hereafter.

Figure 2:
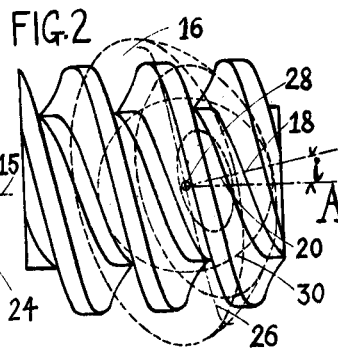
Fig. 2 is a plan view of a helicoidal thread of concave profile, with a grinding wheel shown in dotted lines, the relative positions being such, that grinding engagement takes place along the curved profile of an axial section of the wheel.

Fig. 2 indicates a helicoidal body having threads of concave profile. Contact with a grinding wheel 16, indicated in dotted lines, may be made along profile 18 of the grinding wheel, which coincides with the projection of the wheel axis 20.

Figure 3:
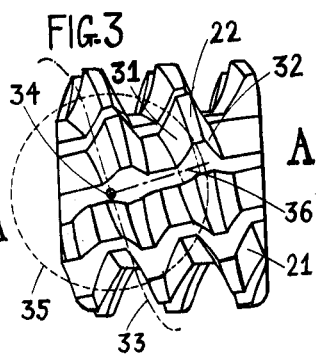
Fig. 3 is a plan view of a hob, having teeth forming a thread as shown in Fig. 2, diagrammatically indicating the position of the axis of a grinding wheel, to illustrate the change necessary due to the relief provided on the teeth of the hob.

Fig. 3 indicates a hob 21 having cutting teeth 22 arranged in helicoidal threads, and represents an example of tools, which may be ground on their relieved sides in accordance with the present invention.

One class of hobs referred to, namely hobs such as may be provided for cutting gears according to my Patent No. 1,601,750 have teeth arranged in helicoidal threads of such nature, that their side surfaces can be considered as surfaces enveloped by a sphere which moves in a helical path. In other words the unrelieved hob threads are surfaces of the same character as the described helical teeth themselves, being parts of convex of concave tube-like surfaces of circular profile in sections at right angles to the helical center line.

A sphere of the diameter of these circular sections, that is to say an imaginary sphere which may sweep out such a surface, will contact with said surface along the circular profile whose center coincides with the center of the sphere. The normals or perpendiculars in the points of contact lie in the plane of the circular profile.

Helicoidal surfaces of this character have been shown in the Figures 1 and 2, illustrating convex and concave surfaces. In Fig. 1 a center line 23 is indicated in dot and dash lines. It can be considered as the path of center 24 of an imaginary sphere 25, and is noted to be inside of the root of the threads 11. In its path along line 23, sphere 25 covers or envelops a surface, of which the surface of thread 11' is a part. The plane which is perpendicular to the center line 23 at the center 24 of sphere 25 is projected into line 14. The axis of grinding wheel 13 lies in this plane, and grinding contact is effected on the circular profile of grinding wheel 13, which is contained in the said plane.

The center of the grinding profile coincides with the center 24 of the imaginary sphere 25. The inclination angle ($i$) of the grinding plane 14 equals the lead angle of the helical center line 23 and can be determined in known manner, as follows $$\tan i = \frac{L}{2\pi R}; \pi = 3.1416.$$

Herein the symbol L denotes the lead of the helicoidal threads and of center line 23, that is the axial pitch multiplied by the number of threads; and R denotes the radius of the center line 23.

It is noted that inclination $i$ of the grinding plane, with respect to the axis of the helicoidal threads, is larger than the inclination of the threads themselves, when the radius R of the center line 23 is smaller than the radius of the threads.

Fig. 2 indicates a preferred manner of positioning a grinding wheel with respect to concave threads. The center line 26 or the path of the center 28 of sphere 30, has a larger radius (R) than the threads, and correspondingly the grinding plane, shown at 20, is inclined to the axis of the threads at an angle $i$ which is smaller than the inclination of the threads.

Fig. 3 refers to a hob having relieved cutting teeth arranged in the form of the helicoidal threads indicated in Fig. 2. The relief naturally changes the lead of the individual side surfaces of the teeth. On the side 31 of the teeth, the lead is increased over the lead of the unrelieved thread, and on the other side 32 the lead is reduced. An extended center line 33 of an individual side 31 is shown in dash and dot lines. It can be considered as the path of the center 34 of an imaginary sphere 35 relatively to the hob. The relief affects not only the lead of the relieved surfaces, but also the diameter of sphere 35, which usually is slightly different as compared with the unrelieved thread. The grinding plane 36 is perpendicular to center line 33.

So far reference has been made only to a specific type of helicoidal surfaces. I have found, however, that all helicoidal surfaces can be considered in good approximation as surfaces which may be swept out by a sphere moving in a helical path. The degree of approximation is what has been called in mathematics the second degree. A surface of the above said character can be determined for any given helicoidal surface whatsoever, in such manner that the two surfaces contact along a helix, preferably placed in the center of the thread surface, and morever that in any section whatsoever the profiles of the two surfaces have the same radii of curvature, in all points of the helix along which the two surfaces contact. This degree of approximation is very sufficient for the purpose considered, which is to locate a most convenient grinding line.

A surface of this nature may be called a curvature surface. It bears a similar relation to a given surface, as a circle of curvature bears to a given curve in plane geometry.

In determining this helicoidal curvature surface, one starts preferably from the normal, or perpendicular to the given surface at a point of the desired helix of contact. The radius of the imaginary sphere may then be computed from such datas as available, with known methods of mathematics. The radius of the sphere equals either the maximum or the minimum radius of curvature of all the normal sections which may be laid through a point of the helix of contact, perpendicular to the thread surface. One curvature surface may be determined with the maximum radius of curvature, and another with the minimum radius of curvature. Naturally the radii of curvature of both of the said surfaces are alike, in equal sections.

Figure 7:
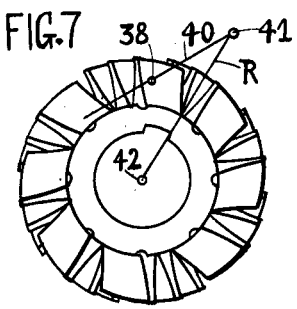
Fig. 7 is an end view of the hob shown in Fig. 3, containing certain auxiliary lines for determining the preferred relationship between hob and grinding wheel.

After having determined the sphere radius, it is plotted on the normal at the point of contact. This has been done in the end view of a hob, Fig. 7, where 38 denotes the considered point of contact, 40 the projected normal, and 41 the sphere center, the latter being located by plotting the computed sphere radius on the projected normal, considering its reduction in length through the projection. Distance 41—42 is then the radius R of the helical center line. This distance can be either computed or scaled directly from the drawing, Fig. 7. With this distance the inclination angle $i$ of the grinding plane can be determined by introducing it as value R in the formula given for tan $i$. The radius of the sphere equals the curvature radius of the grinding line. The grinding wheel is preferably trued to a circular arc of this radius, or, if the radii of curvature of the desired grinding line change rapidly in the different points of the said line, the grinding wheel is trued along a line of changing curvature, preferably along an involute, as will be explained hereafter.

The aspect of the helicoidal curvature surfaces changes within wide limits with changing radii R of the center lines and with changing sphere diameters, aside of changing with the lead. Hollow or convex helicoidal surfaces may be formed in this manner. The center of the imaginary sphere may be located anywhere on normal 40 (Fig. 7), the sphere radius being equal to the actual length of the distance between point 38 and the sphere center 41.

When the said center is infinitely far away on normal 40, the sphere, being of infinite radius, becomes a plane, and the surface swept out or enveloped will be an involute helicoidal surface, containing involutes in sections at right angles to its axis (15). The grinding profile which may be used on involute helicoidal surfaces is straight, corresponding to a circle of infinitely large radius, and the inclination $i$ of the grinding plane is zero, because radius R of the center line is infinitely large. In other words the grinding plane is parallel to the axis (15) of the helicoidal surface.

These results, referring to involute helicoidal surfaces, have been already previously determined in a more direct manner, and the present invention relates therefore only to grinding hobs and milling cutters with grinding wheels of curved profiles, in so far as relative position of grinding wheel and blank is concerned.

The above considerations do not only apply to true helicoidal surfaces, but also to other surfaces, especially to such surfaces as may be produced by relieving in another than axial direction. Such relieved surfaces can be approximated with helicoidal surfaces of the described character.

Figure 4:
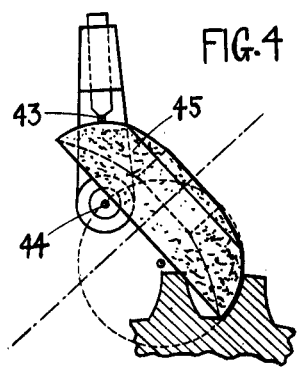
Fig. 4 is a section along lines A—A of Fig. 3, and a view of a grinding wheel in engagement with the hob, the grinding wheel having a circular profile.

If the grinding wheel can be trued to a circular arc, a truing device of known form may be used, as diagrammatically shown in Fig. 4. It contains a diamond 43, which may be swung about a center 44 of a profile of the grinding wheel 45.

In truing a grinding wheel to other curves, namely lines of changing curvature, the truing diamond is preferably so moved, that it is kept in a constant position with respect to the profile normals. Any curve can be considered as the involute of another curve, called evolute, which in the general case may be different from a circle. Frequently however the evolute can be approximated with a circular arc within the range considered, in which case the truing line will be an involute of a circle. In any case, the truing diamond will maintain a constant position to the profile normals, and dress with the same edge in the various relative positions, when it is moved in unison with a tangent (46 in Fig. 5) which is unwrapped from the evolute.

It is essential for accuracy, that the diamond dresses with the same edge when moving along a predetermined curve, and that the possibility is avoided that it dresses with one edge on part of the curve and with another on the rest of the curve. In this latter case the curve would not be truly reproduced.

Figure 5:
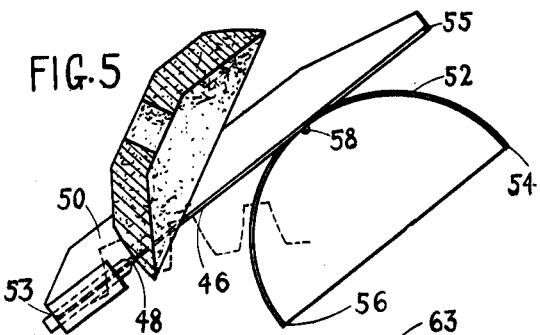
Fig. 5 and Fig. 6 are views of grinding wheels and devices for truing grinding wheels to curves other than circular arcs, as may be used for grinding relieved surfaces in accordance with the present invention.
Figure 6:
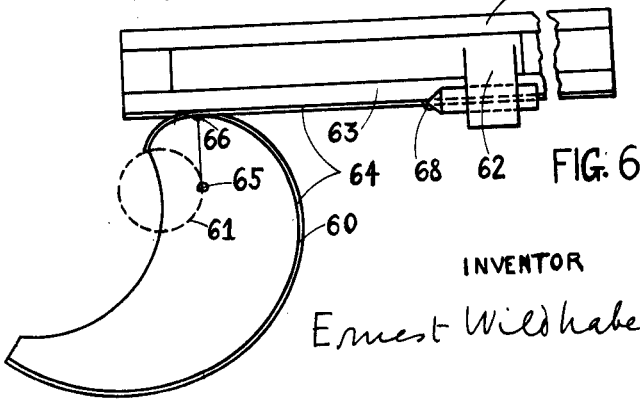

Dressing or truing along lines of changing curvature may be effected as diagrammatically indicated in the Figures 5 and 6. In Fig. 5 the diamond 48 is secured to a member 50, whose straight side 46 is connected with a base circle 52 by means of tapes extending from end 53 of member 50 to end 54 of base circle 52, and from end 55 to end 56. Member 50, secured in this manner to base circle 52, may roll upon it without sliding.

The device is used in such position, that the distance of point 48 from the point of tangency 58 equals the desired radius of curvature along the truing line. The desired rate of change of the radii of curvature along the truing line is effected by properly selecting the diameter of base circle 52.

In Fig. 6 an evolute 60 of changing curvature is provided. Curve 60 is preferably an involute of a circle, its base circle being shown at 61. The device of Fig. 6 is adapted to a great number of different curves by providing an adjustment, by which diamond holder 62 may be set at various positions along member 63, which latter is rolled on curve 60 by means of tapes 64.

Distance 65—66 is made to correspond to the desired rate of change of the radii of curvature, and distance 66—68 is made equal to the desired radius of curvature.

Truing a grinding wheel to an involute has been done before, for grinding gears having involute tooth profiles, in sections at right angles to the gear axes and concentric with said axes. Truing to an involute of a circle or of another form of evolute is here applied to a new and broad field, where the involutes appear in different sections and are not concentric with an axis of rotation. A method of truing is thus provided, which permits to maintain an identical truing curve as applied to warped and complicated surfaces.

Hobs provided with axial relief are preferably ground on their relieved sides in the manner indicated in the Figures 8, 9 and 10.

A hob 70, indicated diagrammatically, is mounted on a cylindrical member 71, which is journalled on two open and stationary bearings 72, 73, and which carries a master form 74, engaging with a stationary rest 75. Member 71 also contains a gear 76 provided with helical teeth. Master form 74 and gear 76 are preferably made of the same outside diameter. A shoe 77 rests on their outside surface and exerts a pressure which is equal to its weight and which may be increased by providing in addition a spring, not shown in the drawing. Shoe 77 fulfills a double purpose: It presses member 71 securely in to its open bearings, and it serves as a brake shoe whose function will be further explained hereafter.

A grinding wheel 78 is suitably mounted on a support 80 of cradle form, which is angularly adjustable about an axis 81 perpendicular to the axis 82 of the blank and of cylindrical member 71, and intersecting said axis. Grinding wheel 78 may be either a plain disk or preferably a wheel of cup form, as indicated. The cup form permits to set the axis 83 of the grinding wheel at a larger angle with respect to axis 82 of the hob, and to use a larger grinding wheel while nevertheless avoiding interference with the protruding cutting faces of the relieved cutting teeth.

When a wheel of plain disk form is used, it is preferably mounted on a slide (84), which is movable on support 80 at an angle to its axis 81, and perpendicular to the direction of the axis 83 of the grinding wheel.

When a grinding wheel of cup shape is provided, it is preferably mounted on top of two cross slides 84, 85, which are disposed one upon the other, and which are individually movable in directions inclined to the axis 81 of support 80. The lower slide is movable in a direction perpendicular to the axis 83 of the grinding wheel.

The master form will now be further explained. A master form for grinding the relieved sides of hobs having a single start or thread is indicated in Fig. 11. This figure shows a development to a plane, one half of the circumference being shown. The threads or protruding parts of the master form are shown shaded. The coherent single thread 88, of which partial sections corresponding to different turns are seen, is provided on one side with surfaces 89 of different inclination or lead as compared with the general inclination, so as to furnish a stepped appearance, whereas the threads are smooth on the other side 86. The lead of the surfaces 89 equals the lead of the relieved surfaces, while the lead of the general thread equals the lead of the hob thread. Fig. 11 relates to the side which contains a larger lead than the lead of the continuous thread. For grinding the relieved surfaces having a smaller lead than the lead of the hob, sides as indicated in dotted lines 87 may be provided. Master form 74 determines the lengthwise form and arrangement of the hob teeth, but has no bearing on their profile.

The operation is as follows:

The helical gear 76 receives alternately forward and backward motion from a rotary helical pinion not indicated. The return motion is preferably effected at a higher speed. The motion of member 71 is guided by the master form 74 which engages stationary rest 75. The rest is preferably so disposed that it engages the master form on the same side as the grinding wheel engages the relieved cutting teeth. The hob is then prevented in a positive manner from moving into the grinding wheel any further than by such small amounts as dictated by the feed of the grinding wheel.

In operating with the particular master form shown in Fig. 11, the latter and the hob are turned upwards, on the side of contact, the grinding faces of the hob looking downward on the grinding side. In other words the relieved teeth are ground backwards, starting on their inner end. If a master form would be used as indicated in dotted lines at 87, the relief surfaces having a smaller lead than the hob thread would be ground, by also moving hob and master form upward, but with the cutting faces of the hob looking upward on the grinding side. The relieved teeth are then ground forward, that is starting on their front end.

It is understood that this procedure merely represents a preferred arrangement for grinding single thread hobs.

Upward motion of the hob on the grinding side is slightly preferred, on account of the greater convenience in observing the operation without being endangered by sparks; when, as usual, the grinding wheel grinds oppositely as compared with the motion of the blank, namely downwardly.

When grinding the relief, the master form leans securely against the stationary rest, and the waved sides keep in continuous contact with said rest. A good contact between master form and rest is obtained, in spite of the grinding pressure tending to separate master form and rest, by providing helical teeth on gear 76, as described. The hand of the helical teeth is so selected, that a thrust is obtained which presses member 71 against the rest. This thrust is maintained at a suitably large amount by applying brake shoe 77. When the grinding wheel has passed all the cutting teeth, the motion of member 71 is reversed, drive being applied in opposite direction. This also reverses the end thrust. The waved side of the master form will then leave contact with the stationary rest and move over a slight amount until it contacts with rest 75 with its smooth side 86. The amount of motion from one side to the other is just enough to move the grinding wheel away from the relieved sides, a distance sufficient to clear these sides on the return stroke. During the return stroke or return pass the smooth side of the master form is kept in continuous contact with rest 75, so that then no relieving motion takes place. The rest 75 remains always in the groove of the master form, and when moving one way touches one side, and when returning touches the other side of said groove. Rest 75 may be of any suitable form, such as a roller, or a piece as shown, fitting the sides of the master form on a certain length.

Hitherto relieved hobs have never been ground to a master form, and such objects with incoherent surfaces or irregular surfaces as have been ground to a master form before, were ground in such manner that the blank was pressed by hand against a master form. The human hand then regulated the contact with the master form, and prevented disruption of contact through the grinding pressure. Never before has this task been mechanically accomplished, as is done in the present case, in which moreover the means used are utterly simple and dependable.

It is also realized that the simplicity of the general means used in grinding the relieved sides of a hob maintains the accuracy of the device or machine during its whole life. If wear takes place in the bearings 72, 73, and whether these bearings are in alignment or out of alignment, the cylindrical member 71 containing the hob will always be moved past the grinding wheel in the direction of its axis and angularly about its axis, and always perform a helical motion. When however a number of different slides is provided for the relative motion between the rotating grinding wheel and the hob, then wear may easily and soon affect the accuracy.

An arrangement for grinding multiple start hobs or multiple thread hobs will now be described. Such hobs contain cutting teeth arranged in a plurality of threads, and it is therefore necessary to index such hobs, to reach all the cutting teeth with a grinding wheel. Multiple start hobs can be ground with the same device as already described without any addition. A master form is provided which contains the same number of starts as the hob to be ground. The entire circumference of a master form corresponding to a triple start hob is indicated in development in Fig. 12. Corresponding parts of master form and hob have the same lead, but not necessarily the same diameter, the master form being preferably provided with a larger diameter.

Figure 12:
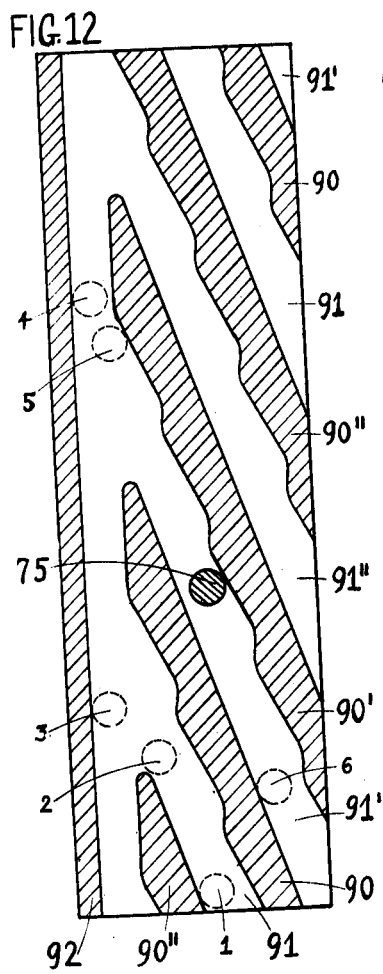
Fig. 12 is a development of a master form, which corresponds to a multiple start hob.

In Fig. 12 the three threads 90, 90', 90'' of the master form form three grooves 91, 91', 91''. A rest 75 is shown in contact with a waved side of a groove 91'. This represents a position, in which grinding contact with a relieved side of the hob takes place, the relieved sides of larger lead being worked on. The hob is supposed to be so set, that its cutting faces look upward on the grinding side, and hob and blank move upward, as compared with the grinding wheel and with the stationary rest 75. The waved side of the master form is securely kept in contact with rest 75 through the end thrust exerted on the helical teeth of gear 76. As before the tooth pressure opposes not only the friction in the bearings 72, 73, but also the more considerable friction obtained by applying brake shoe 77 to the outside of gear 76 and master form 74, so that a tooth pressure and an end thrust of desirable magnitude is obtained.

Considering the relative motion of the stationary rest 75 with respect to movable master form 74, we will start with position 1 shown in dotted lines. This position corresponds to the return stroke. The rest then moves upward, continuous contact with the smooth side of groove 91 being effected through the thrust exerted, in this case, on a left hand helical gear of considerable tooth inclination. The rest then reaches position 2, at the end of thread 90'', where it leaves contact and moves over to position 3, under the influence of the oblique tooth pressure. The grinding wheel is then entirely clear of all helicoidal threads. In position 3 the rest makes contact with a circular thread or projection 92 and then follows this thread until it comes to position 4, where the motion is reversed. With the reversal of the turning motion the thrust is also reversed, and the rest moves over to thread 90' and follows the waved side of that thread to position 5 and position 75 shown in full lines. During this time the relieved sides of the hob teeth are being ground. The rest finally reaches a point near the end of the groove 91' after the grinding wheel has passed all the teeth of the thread. The motion is then again reversed. The rest moves over to the smooth side of groove 91' and follows that side upward, in the same manner as described with reference to groove 91. After having left groove 91', the rest will successively pass through the groove 91'', then again through the grooves 91, 91', 91'', and so on. The hob is therefore indexed after every pass.

It is noted that the grooves of the master form do not compel a single path for the rest 75, and that the desired motion is the result of the means used for guiding and of the means used for driving, namely a master form 74 and helical gear 76.

It is also noted that the whole, complicated function of a hob grinding machine can be obtained with very simple means, and that indexing can be accomplished without an indexing mechanism proper.

During the grinding operation the grinding wheel may be automatically fed in, and it is preferably automatically trued at intervals. Means for feeding the grinding wheel are separately shown, in a larger scale, in the Figures 13 and 14. In Fig. 13, 93 denotes the upper end of a support such as 80 in the Figures 8–10. A slide 94 is movable on said support in a direction at an angle to the axis of said support. It carries a grinding wheel 95 rotatable on an axis 96, which is disposed at right angles to the direction of motion of slide 94. A motor for driving the grinding wheel may be mounted on said slide, but is omitted in the drawing. A device 97 is adjustably mounted on slide 94, adjustment being provided in the direction of the motion of the slide, by placing device 97 on a separate member 98 which may be moved in said direction in a slot of slide 94. Device 97 is arranged for dressing on the side diametrically opposite to the grinding line. For feeding the grinding wheel towards the blank, slide 94 is moved in as a whole, by rotating screw 99 which is journalled on support 93 and held endwise on it. Screw 99 engages a nut 100, which is held endwise in slide 94 but is free to turn. Ordinarily turning motion of nut 100 is prevented by a gear 101 integral with nut 100. Gear 101 meshes with another gear 102 which is angularly fixed, except during operation of the dressing device. Dressing or truing is effected preferably between successive grinding passes. Gear 103 and with it spline shaft 104 is then turned by a slight amount thereby rotating screw 105 in the direction of arrow 106. Shaft 104 is held endwise in support 93, and screw 105, which internally engages shaft 104, is endwise held on slide 94. Rotation of screw 105 advances member 98 and also turns gear 102, which is integral with screw 105. Gear 102 turns gear 101 in opposite direction. If an equal lead has been provided on screws 105 and 99, the ratio of gear 102, 101 is made one to one. Gear 101 and nut 100 are then turned the same amount as screw 105. Inasmuch as screw 99 can be considered stationary, nut 100 will turn on a stationary screw and advance slide 94 by an amount equal to the motion of member 98 on slide 94. The absolute motion of member 98 equals the amount of its own motion plus the amount of motion of slide 94, and is therefore twice as large as the motion of the latter. As the grinding wheel is trued to a smaller diameter, it will immediately be advanced in correspondence with the reduction in its diameter.

While the broad principle of truing in this manner is not new, the combination of means used is believed to be novel and simple.

A device adapted to the use of a grinding wheel of cup form is indicated in Fig. 14. In this case the grinding wheel is fed preferably in the direction 108 of the cup, on the grinding side, as the wheel gets smaller. This feed at an acute angle to the axis of the grinding wheel may be effected by providing a pair of cross slides 110, 111, which are movable at right angles to each other, and by positioning the grinding wheel on the upper slide. The motion of the latter is in the direction of the axis 112 of the grinding wheel, while the motion of the lower slide is at right angles to said axis. 113 denotes a device for truing the grinding wheel along a profile 114, which is diametrically opposite to the grinding line 115. Device 113 is adjustably mounted on the lower slide 110. The means used in the embodiment of Fig. 14 are the same as the ones used in the embodiment of Fig. 13, except for the additional provision of a cross slide 111. The upper and the lower slides are fed in unison, in such manner that the resulting feed is in direction 108. The connection between the two feeds may be effected by attaching to support 93 a straight templet 116, whose inclination equals the inclination of the desired feed. A shoe 117 is pivoted on the cross slide 111, and is kept in contact with templet 116 through the action of a strong spring which draws the cross slide towards the templet.

For ordinary feed the two cross slides are moved in unison, while the truing device 113 maintains its constant position on the lower slide 110. For dressing or truing, device 113 is advanced, and in unison with it also the two slides 110, 111.

Various changes and modifications may be made in my invention by applying the knowledge and customary practice of the art and without departing from its spirit. For definition of the scope of my invention I rely on the appended claims.

What I claim is:

1. The method of grinding relief on tools, which consists in so positioning a grinding wheel and a rotary tool blank relatively to each other that grinding contact is effected substantially along the profile of an axial section of the grinding wheel, said profile being curved and said axial section being inclined to the axis of the tool, in rotating said grinding wheel on an axis offset from and angularly disposed to the axis of the tool, and in providing relative motion between grinding wheel and tool along a straight line and angularly about the axis of the tool.

2. The method of grinding relief on tools, which consists in so positioning a grinding wheel and a rotary tool blank relatively to each other, that grinding contact is effected substantially along the profile of an axial section of the grinding wheel, said profile being a circular arc and said axial section being inclined to the axis of the tool, in rotating said grinding wheel on an axis offset from and angularly disposed to the axis of the tool, and in providing relative motion between grinding wheel and tool along a straight line and angularly about the axis of the tool.

3. The method of grinding relief on tools, which consists in rotating a grinding wheel adjacent a rotary tool on an axis offset from and angularly disposed to the axis of said tool, the amount of offset being smaller than the outside radius of the tool, in providing relative motion between grinding wheel and tool along a straight line and angularly about the axis of the tool, and in adjusting the grinding wheel in a plane which is inclined to the axis of the tool.

4. The method of grinding relief on hobs, which consists in mounting a hob adjacent a rotating grinding wheel on a member containing cylindrical portions, in providing a master form on said member, in journalling said member on bearing means engaging said cylindrical portions, and in moving said member relatively to said bearing means in the direction of its axis and angularly about its axis, past said grinding wheel.

5. The method of grinding relief on hobs, which consists in mounting a hob adjacent a rotating grinding wheel on a member containing cylindrical portions, in providing a master form on said member, in positioning a stationary rest in contact with the master form, in journalling said member on bearings engaging said cylindrical portions, and in moving said member relatively to said bearings in the direction of its axis and angularly about its axis, past said grinding wheel.

6. The method of grinding relief on hobs, which consists in mounting a hob coaxially on a cylindrical member adjacent a rotating grinding wheel, in providing a master form on said member, in positioning a stationary rest in engagement with the master form, in providing frictional resistance opposing the motion of said member, in imparting pressure to said member in such manner that it moves in accordance with the master form in the direction of its axis and angularly about its axis, a different path being provided when moving in one direction and when moving in the opposite direction.

7. The method of grinding relief on hobs, which consists in mounting a hob coaxially on a cylindrical member adjacent a rotating grinding wheel, in providing a master form on said member, in exerting such pressure on said member outside of said master form as to effect axial thrust as well as a turning moment on said member, and in moving said member with said pressure in accordance with the said master form in the direction of the axis of said member and angularly about said axis.

8. The method of grinding relief on hobs, which consists in mounting a hob coaxially on a cylindrical member adjacent a rotating grinding wheel, in providing a master form on said member, said master form engaging with a stationary rest, in applying pressure on helical teeth forming part of said member, and in thereby moving said member in the direction of its axis and angularly about its axis.

9. In a device for grinding hobs, a support adjustable about an axis perpendicular to the axis of the hob and intersecting the axis of the hob, a slide disposed on said support, said slide being movable along a straight line angularly disposed to said axis of said support, and a grinding wheel disposed on said slide, the axis of the grinding wheel being perpendicular to the direction of motion of the slide and inclined to a plane perpendicular to the axis of said support.

10. The method of grinding relief on multiple start hobs, which consists in mounting a hob on a member containing cylindrical portions adjacent a rotating grinding wheel of curved profile, in providing a master form on said member, in positioning a stationary rest in engagement with the master form, in journalling said member on bearing means engaging said cylindrical portions, in periodically moving said member relatively to said bearing means in the direction of its axis and angularly about its axis, and in indexing said member in each period of motion.

11. In a device for grinding relief on tools, a support adjustable about an axis, said axis being located in a plane perpendicular to the axis of a rotary tool blank, a grinding wheel of curved profile disposed on said support, said grinding wheel being rotatable on an axis inclined to a plane perpendicular to the axis of said support, a tool blank, and means for effecting relieving motion between said tool blank and said grinding wheel.

12. In a device for grinding relief on hobs, a support adjustable about an axis perpendicular to the axis of the hob and intersecting the axis of the hob, a grinding wheel of curved profile rotatable on an axis inclined to a plane perpendicular to the axis of the support, said grinding wheel being disposed on said support, a hob blank, and means for effecting relieving motion between said hob blank and said grinding wheel.

13. The method of grinding relief on hobs, which consists in providing a grinding wheel whose grinding surface contains a circular profile in a plane other than a plane perpendicular to its axis of rotation, in so positioning said grinding wheel adjacent a hob that grinding contact is effected along a curved line whose plane is inclined to the axis of the hob, in rotating said grinding wheel on an axis inclined to and offset from the axis of the hob, the amount of offset being smaller than the outside radius of said hob, and in providing relieving motion between grinding wheel and hob.

14. In a device for grinding relief on hobs, a member containing cylindrical portions, means for mounting a hob coaxially on said member, bearing means engaging said cylindrical portions for journalling said member, a grinding wheel disposed adjacent said hob in substantially constant relation to said bearing means, guiding means and driving means for moving said member relatively to said bearing means in the direction of its axis and angularly about its axis.

15. In a device for grinding relief on hobs, a hob blank, a rotating grinding wheel, a master form for controlling relative motion between said hob blank and said grinding wheel, means for effecting periodical relative motion between said hob blank and said grinding wheel, and frictional means for maintaining said hob blank and said grinding wheel out of engagement during relative motion in one direction.

16. In a device for grinding relief on multiple start hobs, a hob blank, a rotating grinding wheel, a master form for controlling relative motion between said hob blank and said grinding wheel, means for effecting relative motion between said hob blank and said grinding wheel, and frictional means for indexing said hob blank.

17. In a device for grinding relief on hobs, a hob blank, a rotating grinding wheel, a master form for controlling relative motion between said hob blank and said grinding wheel, said master form having a wavy character corresponding to relieved sides of cutting teeth arranged in a thread, helical teeth provided on a part rigidly connected with said master form, and means for exerting pressure on said helical teeth.

18. In a device for grinding relief on hobs, a hob, a master form mounted coaxial with said hob, said master form having a wavy character corresponding to the relieved sides of cutting teeth arranged in a thread, a grinding wheel, and means for imparting motion to the hob.

19. In a device for grinding hobs, a support adjustable about an axis, said axis being located in a plane perpendicular to the axis of the hob, a slide disposed on said support, said slide being movable in a direction at an angle to the axis of said support, and a grinding wheel so positioned on said slide that its axis is inclined to a plane perpendicular to the axis of said support.

20. In a device for grinding hobs, a support adjustable about an axis perpendicular to the axis of the hob and intersecting the axis of the hob, a pair of cross slides disposed one upon the other and on said support, said cross slides being movable in directions inclined to the axis of said support, and a grinding wheel so positioned on said slides that its axis is inclined to a plane perpendicular to the axis of said support.

ERNEST WILDHABER.